US010074325B2

United States Patent
Park et al.

(10) Patent No.: US 10,074,325 B2
(45) Date of Patent: Sep. 11, 2018

(54) DISPLAY DEVICE HAVING DUMMY PIXEL BLACK IMAGE DISPLAY IN A NON-DISPLAY AREA

(71) Applicant: SAMSUNG DISPLAY CO., LTD., Yongin-si, Gyeonggi-do (KR)

(72) Inventors: Kyung Ho Park, Yongin-si (KR); Min Sik Jung, Yongin-si (KR); Young Gu Kim, Yongin-si (KR); Baek Kyun Jeon, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 153 days.

(21) Appl. No.: 15/008,839

(22) Filed: Jan. 28, 2016

(65) Prior Publication Data
US 2017/0011693 A1    Jan. 12, 2017

(30) Foreign Application Priority Data
Jul. 9, 2015  (KR) .................. 10-2015-0097775

(51) Int. Cl.
*G09G 3/36*  (2006.01)
*G02F 1/1362*  (2006.01)

(52) U.S. Cl.
CPC ..... *G09G 3/3625* (2013.01); *G02F 1/136286* (2013.01); *G09G 3/3614* (2013.01);
(Continued)

(58) Field of Classification Search
CPC ............... G09G 3/3614; G09G 3/3688; G09G 2300/0413; G09G 3/3648; G09G 3/3625;
(Continued)

(56) References Cited

U.S. PATENT DOCUMENTS 6,063,829 A    5/2000  Endou et al.
2002/0008800 A1*  1/2002  Matsumoto ....... G02F 1/136209
                                                    349/44
(Continued)

FOREIGN PATENT DOCUMENTS

JP    2008-116809    5/2008
JP    2011-150371    8/2011
(Continued)

*Primary Examiner* — Darlene M Ritchie
(74) *Attorney, Agent, or Firm* — F. Chau & Associates, LLC

(57) ABSTRACT

A display device includes a first base substrate, first through n-th gate lines, first through (m+1)-th data lines, and a plurality of pixels. Each of the first through n-th gate lines extends in a first direction. Each of the first through (m+1)-th data lines extends in a second direction crossing the first direction. The plurality of pixels is arranged in a matrix form. Each of the plurality of pixels is coupled to a corresponding one of the gate lines and a corresponding one of the data lines. Each pixel in the first column among the plurality of pixels is independently driven from each pixel in the second column among the plurality of pixels. Pixels in the first column and pixels in the m-th column are provided in the non-display area. Pixels coupled to the first data line and pixels coupled to the (m+1)-th data line display a black image.

20 Claims, 7 Drawing Sheets

(52) U.S. Cl.
CPC ... *G09G 3/3688* (2013.01); *G09G 2300/0413* (2013.01); *G09G 2310/08* (2013.01); *G09G 2320/0233* (2013.01)

(58) Field of Classification Search
CPC ... G09G 2320/0233; G09G 2320/0247; G09G 2310/02; G02F 1/136286
See application file for complete search history.

(56) References Cited

U.S. PATENT DOCUMENTS

| | | | |
|---|---|---|---|
| 2002/0109652 A1* | 8/2002 | Lim | G09G 3/3648 345/87 |
| 2002/0130829 A1* | 9/2002 | Ilda | G09G 3/3655 345/87 |
| 2005/0184940 A1 | 8/2005 | Oh et al. | |
| 2007/0035687 A1* | 2/2007 | Oke | G09G 3/3614 349/143 |
| 2009/0085853 A1* | 4/2009 | Um | G09G 3/3659 345/92 |
| 2011/0007257 A1 | 1/2011 | Min et al. | |
| 2016/0048050 A1* | 2/2016 | Okada | G01D 11/28 349/58 |

FOREIGN PATENT DOCUMENTS

| | | |
|---|---|---|
| JP | 2012-093642 | 5/2012 |
| KR | 1020050082488 | 8/2005 |
| KR | 1020080109159 | 12/2008 |
| KR | 1020110005512 | 1/2011 |

\* cited by examiner (COMPARATIVE EXAMPLE)

(COMPARATIVE EXAMPLE)

DISPLAY DEVICE HAVING DUMMY PIXEL BLACK IMAGE DISPLAY IN A NON-DISPLAY AREA

CROSS-REFERENCE TO RELATED APPLICATION

This application claims priority under 35 U.S.C. § 119 to Korean Patent Application No. 10-2015-0097775, filed on Jul. 9, 2015, in the Korean Intellectual Property Office, the disclosure of which is incorporated by reference herein in its entirety.

TECHNICAL FIELD

The present inventive concept relates to a display device, and more particularly, to a display device whose display quality is improved.

DISCUSSION OF THE RELATED ART

A display device includes a liquid crystal display device. The liquid crystal display device may include liquid crystal layer formed between two substrates and may display an image by adjusting an amount of light transmitting through the liquid crystal layer according to an electric field formed between the two substrates. The display device may be driven by an inversion driving method by which polarities of data voltage applied to pixels are temporally or spatially inverted to improve display quality and prevent pixel degradation thereof.

SUMMARY OF THE INVENTION

According to an embodiment of the present inventive concept, a display device is provided. The display device includes a display area and a non-display area provided in at least one side of the display area. An image is displayed in the display area. The display device further includes a first base substrate, first through n-th gate lines, first through (m+1)-th data lines, and a plurality of pixels. The first through n-th gate lines are provided on the first base substrate. Each of the first through n-th gate lines extends in a first direction (n is a natural number equal to or greater than 1). The first through (m+1)-th data lines are provided on the first base substrate. Each of the first through (m+1)-th data lines extends in a second direction crossing the first direction (m is a natural number equal to or greater than 1). The plurality of pixels is arranged in a matrix form. Each of the plurality of pixels is coupled to a corresponding gate line of the gate lines and a corresponding data line of the data lines. Each pixel in a first column among the plurality of pixels is independently driven from each pixel in a second column among the plurality of pixels. Pixels in the first column among the plurality of pixels and pixels in the m-th column among the plurality of pixels are provided in the non-display area. Pixels coupled to the first data line among the plurality of pixels and pixels coupled to the (m+1)-th data line among the plurality of pixels display a black image.

A first pixel coupled to an odd-numbered gate line among the plurality of pixels may be coupled to a data line disposed on one side of the first pixel in the first direction. A second pixel coupled to an even-numbered gate line among the plurality of pixels may be coupled to a data line disposed on another side of the second pixel in the first direction.

Each of the plurality of pixels may include a thin film transistor, a pixel electrode, a common electrode, and a liquid crystal layer. The thin film transistor may be coupled to the corresponding gate line and the corresponding data line. The pixel electrode may be coupled to the thin film transistor. The common electrode may electrically be separated from the pixel electrode. The common voltage may be applied to the common electrode. The liquid crystal layer may be provided on the first base substrate.

The display device may further include a gate driver and a data driver. The gate driver may be configured to output a gate signal to the gate lines. The data driver may be configured to output a data voltage to the data lines in response to the gate signal.

In an odd-numbered frame, a data voltage with a first polarity may be applied to an odd-numbered data line, and a data voltage with a second polarity opposite to the first polarity may be applied to an even-numbered data line.

In an even-numbered frame, the data voltage with the second polarity may be applied to the odd-numbered data line, and the data voltage with the first polarity may be applied to the even-numbered data line.

The first polarity may be a positive polarity with respect to the common voltage, and the second polarity may be a negative polarity with respect to the common voltage.

The first polarity may be a negative polarity with respect to the common voltage, and the second polarity may be a positive polarity with respect to the common voltage.

The display device may further include a second base substrate. The second base substrate may face the first base substrate. The liquid crystal layer may be interposed between the second base substrate and the first base substrate.

Each of the pixel electrode and the common electrode may be provided between the first base substrate and the liquid crystal layer.

The pixel electrode may be disposed between the first base substrate and the liquid crystal layer, and the common electrode may be provided between the second base substrate and the liquid crystal layer.

The display device may further include a first alignment layer and a second alignment layer. The first alignment layer may be provided between the first base substrate and the liquid crystal layer. The second alignment layer may be provided between the second base substrate and the liquid crystal layer.

The display device may further include a black matrix. The black matrix may be provided on at least one of the first base substrate and the second base substrate. At least a portion of the black matrix may overlap a pixel in the first column or the m-th column.

According to an embodiment of the present inventive concept, a display panel is provided. The display panel includes first through n-th gate lines, first through (m+1)-th data lines, and a plurality of pixels. Each of the first through n-th gate lines extends in a first direction (n is a natural number equal to or greater than 1). Each of the first through (m+1)-th data lines extends in a second direction crossing the first direction (m is a natural number equal to or greater than 1). Each of the plurality of pixels is arranged in a matrix form. Each of the plurality of pixels is connected to a corresponding gate line of the gate lines and a corresponding data line of the data lines. Pixels in a first row are respectively connected to the first through m-th data lines. Pixels in a second row adjacent to the first row are respectively connected to the second through (m+1)-th data lines.

Pixels in a second column among the plurality of pixels may be disposed in a display area of the display panel. Pixels in a first column adjacent to the second column among the plurality of pixels may be disposed in a non-display area. The non-display area may be disposed on one side of the display area in the first direction.

Pixels in an m-th column among the plurality of pixels may be disposed in the non-display area disposed on another one side of the display area in the first direction. Pixels in an (m−1)-th column adjacent to the m-th column among the plurality of pixels may be disposed in the display area.

Each of the pixels in the first column may display a black image.

In a first frame, a data voltage applied to the first data line may have a first polarity, and a data voltage applied to the second data line may have a second polarity opposite the first polarity. In a second frame subsequent to the first frame, the data voltage applied to the first data line may have the second polarity, and the data voltage applied to the second data line may have the first polarity. The first and second data lines may be adjacent to each other.

BRIEF DESCRIPTION OF THE DRAWINGS

The above and other features of the present inventive concept will become more apparent by describing in detail exemplary embodiments thereof with reference to the accompanying drawings in which.

DETAILED DESCRIPTION OF THE INVENTION

Figure 1:
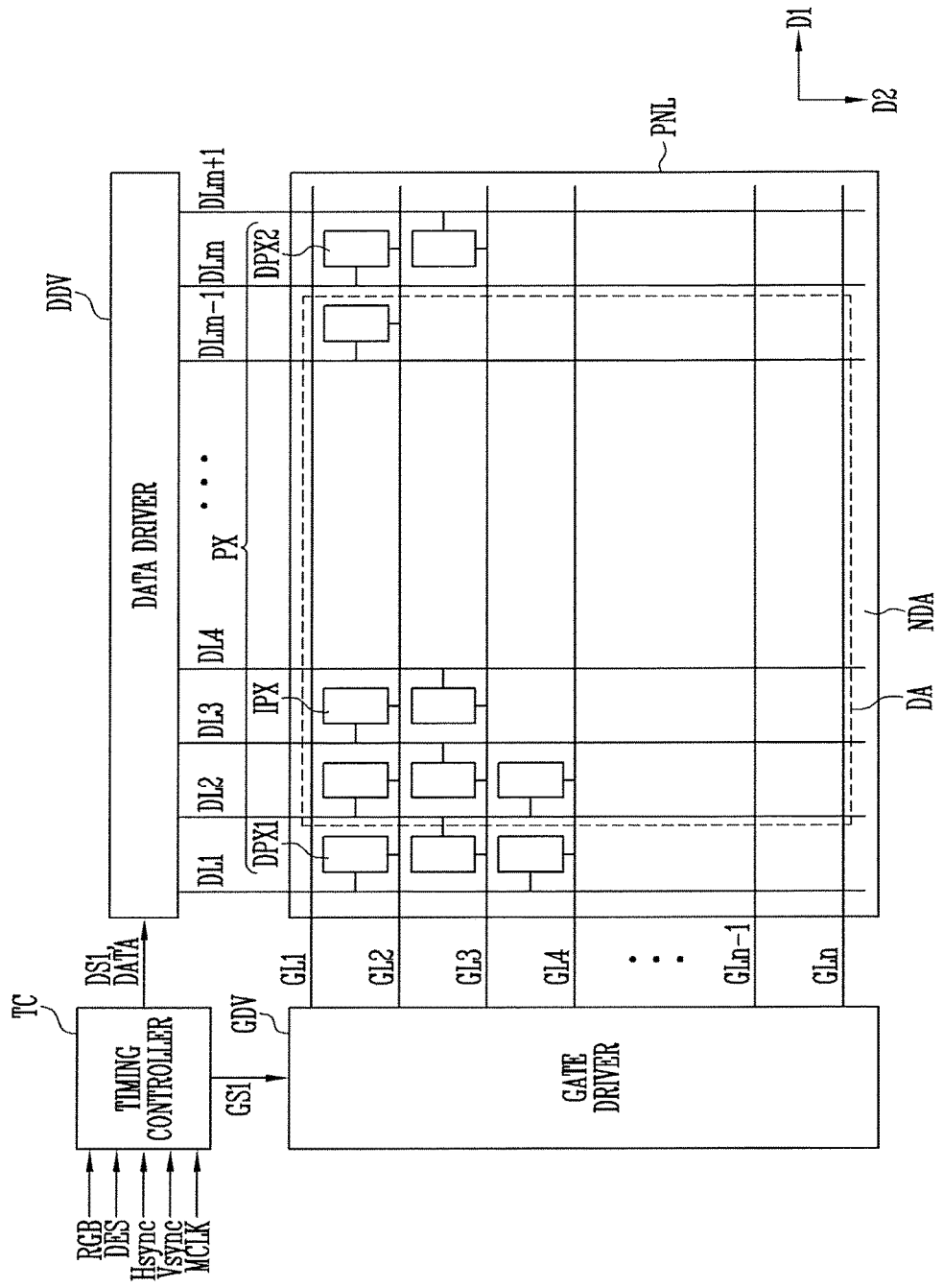
FIG. 1 is a block diagram of a display device according to an embodiment of the present inventive concept.

Hereinafter, exemplary embodiments of the present inventive concept will be described more fully with reference to the accompanying drawings.

In the drawings, dimensions may be exaggerated for clarity of illustration. It will be understood that when an element is referred to as being "between" two elements, it can be the only element between the two elements, or one or more intervening elements may also be present.

Like reference numerals refer to like elements throughout the specification and drawings. As used herein, the singular forms "a", "an" and "the" are intended to include the plural forms as well, unless the context clearly indicates otherwise.

FIG. 1 is a block diagram of a display device according to an embodiment of the present inventive concept.

Referring to FIG. 1, the display device according to an embodiment of the present inventive concept includes a display panel PNL, a timing controller TC, a gate driver GDV, and a data driver DDV.

The display panel PNL may be a liquid crystal panel which includes a liquid crystal layer. The display panel PNL according to an embodiment of the present inventive concept includes a display area DA on which an image is displayed, and a non-display area NDA which is formed in at least one side of the display area DA.

The display panel PNL includes gate lines GL1 to GLn, data lines DL1 to DLm+1, and pixels PX. The gate lines GL1 to GLn, the data lines DL1 to DLm+1, and the pixels PX are formed over the display area DA and the non-display area NDA.

The gate lines GL1 to GLn extend in a first direction D1, and are sequentially arranged in a second direction D2 crossing the first direction D1.

The data lines DL1 to DLm+1 extend in the second direction D2 and are sequentially arranged in the first direction D1.

The pixels PX are arranged in a matrix form. The pixels PX are arranged in rows and columns in the first direction D1 and the second direction D2. In the arrangement of the pixels PX, the first direction D1 may correspond one of the row and column, and the second direction D2 may correspond another one of the row and column. In an embodiment of the present inventive concept, the first direction D1 may correspond to the row, and the second direction D2 may correspond to the column.

The timing controller TC receives image data RGB and a control signal from an external graphic control unit. The image data RGB may include image data for red color R, image data for green color G, and image data for blue color B. The image data for red color R, the image data for green color G, and the image data for blue color B may include data correspond to the pixels PX, respectively. The control signal may include a vertical synchronization signal Vsync that is a frame distinction signal, a horizontal synchronization signal Hsync that is a row distinction signal, a data enable signal DES, and a main clock signal MCLK. The enable signal DES may have a high level when data is output to display a section to which data is input.

The timing controller TC converts the image data RGB into image data DATA to be fit to drive the data driver DDV, and outputs the converted image data DATA to the data driver DDV. The timing controller TC generates a gate control signal GS 1 and a data control signal DS 1 based on the control signal received from the external graphic control unit. The timing controller TC outputs the gate control signal GS 1 to the gate driver GDV, and outputs the data control signal DS 1 to the data driver DDV. The gate control signal GS 1 drives the gate driver GDV, and the data control signal DS 1 drives the data driver DDV.

The gate driver GDV generates a gate signal for each of the gate lines GL1 to GLn on the basis of the gate control signal GS 1, and outputs the gate signals to the gate lines GL1 to GLn, respectively. The gate control signal GS 1 may include a scan start signal that indicates start of scan, at least one clock signal that controls an output period (e.g., an activation period) of a gate-on voltage, an output enable signal that adjusts (e.g., limits) a duration time of the gate-on voltage, or the like.

The data driver DDV generates a gray-scale voltage for each of the data lines DL1 to DLm according to the image data DATA on the basis of the data control signal DS 1, and separately outputs the gray-scale voltage to each of the data lines DL1 to DLm+1 as a data voltage. The data voltage may include a positive data voltage having a positive polarity with respect to a common voltage, and a negative data voltage having a negative polarity with respect to the common voltage.

The data control signal DS 1 may include a horizontal start signal STH that indicates starting of transmission of the image data DATA to the data driver DDV, a load signal that indicates applying of a data voltage to the data lines DL1 to DLm, an inverting signal that inverts a polarity of the data voltage with respect to the common voltage, or the like.

Each of the timing controller TC, the gate driver GDV, and the data driver DDV may be directly mounted in the display panel PNL in a form of at least one integrated circuit chip. In an embodiment of the present inventive concept, each of the timing controller TC, the gate driver GDV, and the data driver DDV may be affixed to the display panel PNL in a form of a tape carrier package (TCP) in a state of being mounted on a flexible printed circuit board, or may be mounted on a separated printed circuit board. In an embodiment of the present inventive concept, at least one of the gate driver GDV and the data driver DDV may be integrated into the display panel PNL together with the gate lines GL1 to GLn, the data lines DL1 to DLm, and the transistor. In addition, the timing controller TC, the gate driver GDV, and the data driver DDV may be integrated into a single chip.

Figure 2:
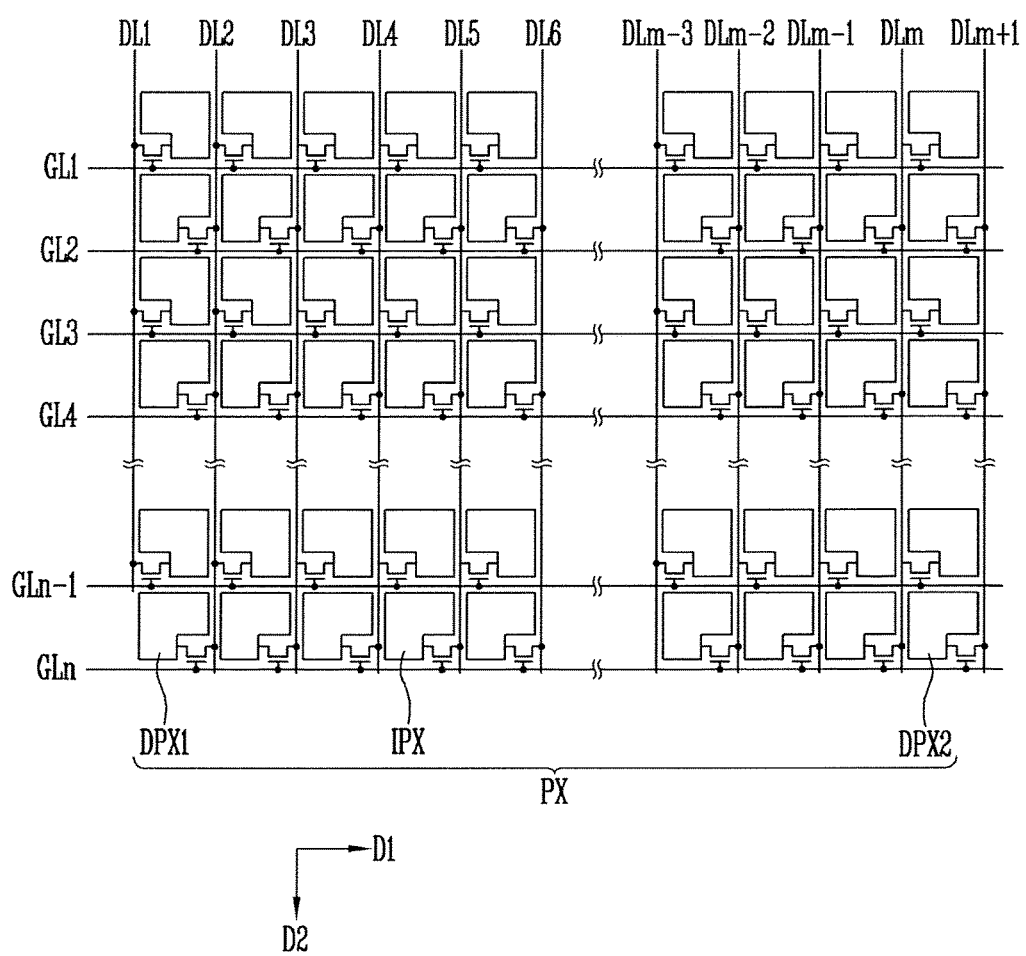
FIG. 2 is a plan view illustrating a display panel of FIG. 1 according to an embodiment of the present inventive concept.

FIG. 2 is a plan view illustrating the display panel of FIG. 1 according to an embodiment of the present inventive concept.

Referring to FIGS. 1 and 2, each pixel PX may be coupled to a corresponding gate line among the gate lines GL1 to GLn, and a corresponding data line among the data lines DL1 to DLm. The pixels PX may include a plurality of first pixels coupled (e.g., connected) to odd-numbered gate lines (e.g., GL1, GL3, GL5, or the like) of the gate lines GL1 to GLn and a plurality of second pixels coupled to even-numbered gate lines (e.g., GL2, GL4, GL6, or the like) of the gate lines GL1 to GLn. Each of the plurality of first pixels is coupled to a data line (e.g., an odd-numbered data line) disposed at one side (e.g., a left side) of the each of the first pixels in the first direction D1 (e.g., a row direction). Each of the plurality of second pixels is coupled to a data line (e.g., an even-numbered data line) disposed at another side (e.g., a right side) of the each of the second pixels in the first direction D1. Accordingly, pixels arranged in the same row are coupled to the same gate line. In addition, pixels arranged in the same column are alternately coupled to one of the odd-numbered data lines and one of the even-numbered data lines. For example, one of adjacent pixels arranged in the same column may be connected to one of adjacent data lines, and another one of the adjacent pixels arranged in the same column may be connected to another one of the adjacent data lines. For example, pixels arranged in odd-numbered rows of the j-th column may be connected to one (e.g., j-th data line) of adjacent data lines, and pixels arranged in even-numbered rows of the j-th column may be connected to another one (e.g., (j+1)-th data line) of the adjacent data lines.

Hereinafter, a coupling relationship (e.g., connectivity relationship) according to the first direction D1 (e.g., the row direction) between a pixel and a data line or the pixel and a gate line will be described. Pixels arranged in an i-th row (i is an odd natural number equal to or greater than 1 and equal to or smaller than n) are sequentially coupled to the first data lines DL1 through the m-th data line DLm, and pixels in an (i+1)-th row are sequentially coupled to the second data line DL2 through the (m+1)-th data line DLm+1.

For example, a pixel arranged in the i-th row and a j-th column is coupled to an i-th gate line and a j-th data line, and a pixel arranged in the (i+1)-th row and the j-th column is coupled to an (i+1)-th gate line and a (j+1)-th data line.

In addition, a coupling relationship according to the second direction D2 (e.g., the column direction) between a pixel and a data line or the pixel and a gate line will be described. Pixels arranged in an j-th column (j is an odd natural number equal to or greater than 1 and equal to or smaller than (m+1)) are sequentially coupled to the first gate line GL1 through the n-th gate line GLn, and pixels in an (j+1)-th column are sequentially coupled to the first gate line GL1 through the n-th gate line GLn. For example, the pixel arranged in the i-th row and the j-th column is coupled to the i-th gate line and the j-th data line, and a pixel arranged in the i-th row and a (j+1)-th column is coupled to the i-th gate line and the (j+1)-th data line.

Each pixel PX includes a thin film transistor coupled to a corresponding gate line and a corresponding data line, a pixel electrode coupled to the thin film transistor, a common electrode which is separated from the pixel electrode, and a liquid crystal layer. A common voltage is applied to the common electrode. A structure of each pixel will be described later.

The pixels PX includes a plurality of display pixels IPX provided in the display area DA, and a plurality of dummy pixels DPX1 and DPX2 provided in the non-display area NDA. The dummy pixels DPX1 and DPX2 may be provided on at least one side of the display pixels IPX in the row direction (e.g., the first direction D1). In an embodiment of the present inventive concept, the dummy pixels DPX1 and DPX2 may be provided on both sides of the display pixels IPX in the row direction as illustrated in FIG. 2. The dummy pixels provided on one side of the display pixels IPX in the row direction may be referred to as first dummy pixels DPX1, and the dummy pixels provided on another side of the display pixels in the row direction may be referred to as second dummy pixels DPX2.

In an embodiment of the present inventive concept, the first dummy pixels DPX1 may be pixels coupled to the first data line DL1, and the second dummy pixels DPX2 may be pixels coupled to the last data line (e.g., the (m+1)-th data line DLM+1). In an embodiment of the present inventive concept, a black gray-scale data voltage (e.g., a voltage corresponding to a black image) is provided such that the pixels coupled to the first data line DL1 and the (m+1)-th data line DLm+1 display a black image (e.g., black color). The black gray-scale data voltage may be provided as a positive data voltage or a negative data voltage, and may be provided to display the black image all the time regardless of the polarity of the black-scale data voltage.

The pixels coupled to the first data line DL1 among the first dummy pixels DPX1 are pixels in the odd-numbered rows of the first column, and the pixels coupled to the (m+1)-th data line DLm+1 among the second dummy pixels DPX2 are pixels in the even-numbered rows of the m-th column.

The display panel PNL including the pixels PX will be described with reference to FIGS. 3A and 3B.

Figure 3A:
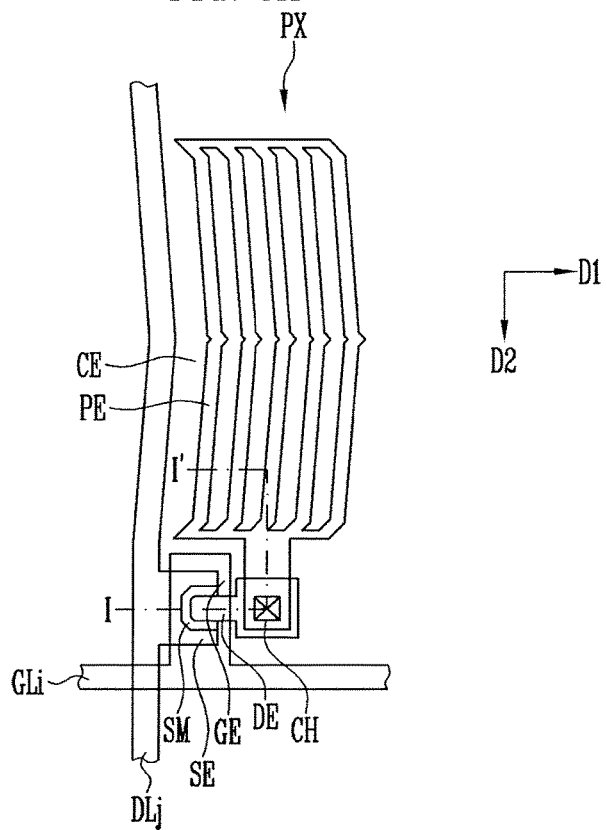
FIG. 3A is a plan view illustrating a pixel which is coupled to an i-th gate line and a j-th data line of FIG. 2 according to an embodiment of the present inventive concept.

FIG. 3A is a plan view illustrating a pixel coupled to the i-th gate line (e.g., an odd-numbered gate line) and the j-th data line of FIG. 2 according to an embodiment of the present inventive concept. FIG. 3B is a sectional diagram taken along I-I' line of FIG. 3A according to an embodiment of the present inventive concept. As described above, i is an odd natural number equal to or greater than 1 and equal to or smaller than n, and j is a natural number equal to or greater than 1 and equal to or smaller than m+1. Since the structure of a pixel coupled to the (i+1)-th gate line (e.g., an even-numbered gate line) and the j-th date line is substantially the same as that of the pixel coupled to the i-th gate line (e.g., an odd-numbered gate line) and the j-th date line except that directions in which the pixel is coupled to the gate and data lines, detailed description thereof will be omitted.

Figure 3B:
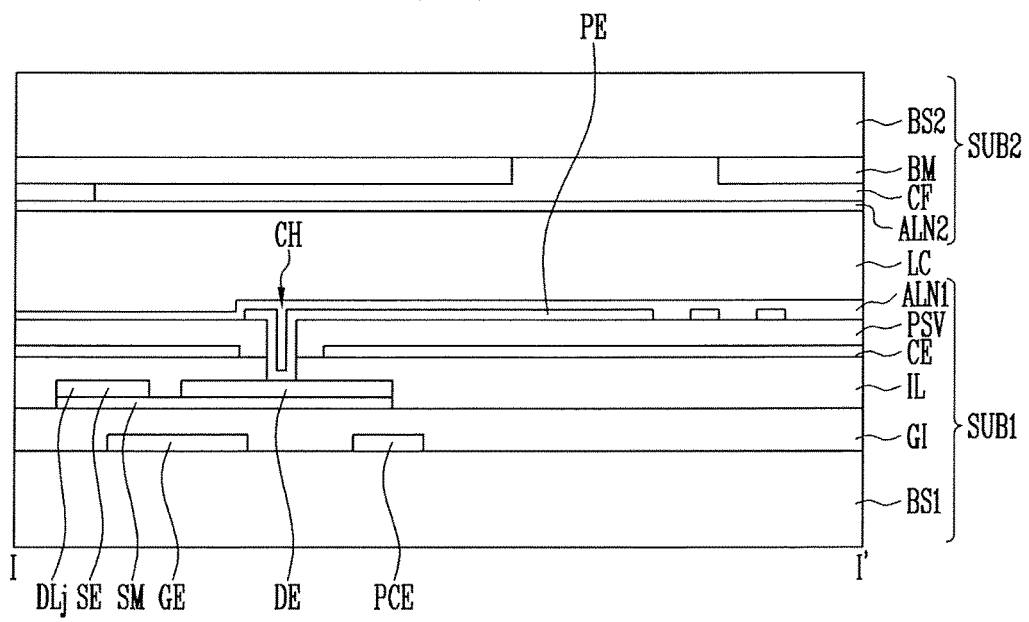
FIG. 3B is a sectional diagram taken along I-I' line of FIG. 3A according to an embodiment of the present inventive concept.

Referring to FIGS. 3A and 3B, the display panel PNL according to an embodiment of the present inventive concept includes a first substrate SUB1, a second substrate SUB2 that faces the first substrate SUB1, and a liquid crystal layer LC that is disposed between the first substrate SUB1 and the second substrate SUB2.

The first substrate SUB1 includes a base substrate BS1, a wiring that is provided on the base substrate BS1, a transistor TR that is coupled to the wiring, a pixel electrode PE that is coupled to the transistor TR, a common electrode CE that is separated and insulated from the pixel electrode PE, and an alignment layer ALN1.

The wiring may include n gate lines and m+1 data lines. An i-th gate line GLi and a j-th data line DLj are illustrated in FIGS. 3A and 3B for brevity of description.

The i-th gate line GLi extends in the first direction D1 on the base substrate BS1. The j-th data line extends in the second direction D2 crossing the first direction D1. A gate insulating layer GI is interposed between the i-th gate line GLi and the j-th data line DLj. The i-th gate line GLi and/or the j-th data line DLj may be provided in a straight line shape, but the present inventive concept is not limited thereto. For example, the i-th gate line GLi and/or the j-th data line DLj may have a shape having at least one bending portion.

The gate insulating layer GI may be made of an insulating material, and the gate insulating layer GI may include silicon nitride or silicon oxide.

The transistor TR is coupled to the i-th gate line GLi and the j-th data line DLj. The transistor TR includes a gate electrode GE, a semiconductor pattern SM, a source electrode SE, and a drain electrode DE.

The gate electrode GE protrudes from the i-th gate line GLi. For example, the gate electrode GE may be provided on a partial area of the i-th gate line GLi.

The gate electrode GE may include a metal. For example, the gate electrode GE may be include a metal such as nickel, chromium, molybdenum, aluminum, titanium, copper, tungsten, or the like, or an alloy thereof. The gate electrode GE may be formed of a single film or multi-films which include the metal. For example, the gate electrode GE may be formed of triple films in which molybdenum, aluminum, and molybdenum are sequentially stacked on each other, or may be formed of double films in which titanium and copper are sequentially stacked on each other. In an exemplary embodiment of the present inventive concept, the gate electrode GE may be formed of a single film including an alloy of titanium and copper.

The semiconductor pattern SM is provided on the gate insulating layer GI. The semiconductor pattern SM is disposed on the gate electrode GE, and the gate insulating layer GI is interposed between the semiconductor pattern SM and the gate electrode GE.

The semiconductor pattern SM includes a portion which overlaps the gate electrode GE. The semiconductor pattern SM may include an amorphous silicon thin film, an oxide semiconductor thin film, or the like.

The source electrode SE is provided to be branched from the j-th data line DLj. For example, the source electrode SE may protrude from the j-th data line DLj. The source electrode SE is formed on the semiconductor pattern SM, and a portion of the source electrode SE overlaps the gate electrode GE.

The drain electrode DE is separated from the source electrode SE by the semiconductor pattern SM interposed between the drain electrode DE and the source electrode SE. The drain electrode DE is formed on the semiconductor pattern SM, and a portion of the drain electrode DE is provided to overlap the gate electrode GE.

The source electrode SE and the drain electrode DE may include a metal such as nickel, chromium, molybdenum, aluminum, titanium, copper, tungsten, or the like, or an alloy thereof. The source electrode SE and the drain electrode DE may be formed of a single film or multi-films which include the metal. For example, the source electrode SE and the drain electrode DE may be formed of double films in which titanium and copper are sequentially stacked on each other. In an embodiment of the present inventive concept, the source electrode SE and the drain electrode DE may be formed of a single film including an alloy of titanium and copper.

Since the source electrode SE and the drain electrode DE are separated from each other, an upper surface of the semiconductor pattern SM is exposed between the source electrode SE and the drain electrode DE. The semiconductor pattern SM may form a conductive channel between the source electrode SE and the drain electrode DE, according to whether a voltage is applied to the gate electrode GE.

An interlayer film IL is provided on the source electrode SE and the drain electrode DE. The interlayer film IL includes an insulating material, and may include, for example, silicon nitride, silicon oxide, or the like.

A passivation film PSV is provided on the interlayer film IL. The passivation film PSV may include, for example, silicon nitride, silicon oxide, or the like.

The interlayer film IL and the passivation film PSV have a contact hole CH which exposes a portion of the upper surface of the drain electrode DE.

The pixel electrode PE is provided on the passivation film PSV. The pixel electrode PE is coupled to the drain electrode DE through the contact hole CH. The pixel electrode PE may have a plurality of branches (e.g., protrusions). The branches may be separated from each other. In addition, each of the branches may form an electric field together with the common electrode CE. For example, an electrical field may be formed between each branch of the pixel electrode PE and the common electrode CE. Although FIG. 3B illustrates that a shape of the branch is rectangular, the present inventive concept is not limited thereto, and the branch may be provided in various shapes or types.

Referring to FIG. 3B, the common electrode CE may be provided between the interlayer film IL and the passivation film PSV. The common electrode CE may be formed by a single plate shape to cover a pixel area DA. A shape of the common electrode CE of the present inventive concept is not limited thereto. For example, when the same common voltage may be applied to the common electrodes CE which are coupled to each other at pixel areas adjacent to each other, shapes of the common electrodes CE may be different from each other. Here, an area in which the contact hole CH is provided has an opening. In the opening, the common electrode CE is removed. In addition, the passivation film PSV is interposed between the common electrode CE and the pixel electrode PE. The passivation film PSV insulates the pixel electrode PE from the common electrode CE. The common electrode CE, the pixel electrode PE, and the passivation film PSV form a storage capacitor Cst of each pixel.

The alignment layer ALN1 may be formed between the pixel electrodes PE.

The alignment layer ALN1 may be formed through a light reaction produced by applying light, which is partially or entirely polarized, to a substrate. Here, component materials constituting the alignment layer (e.g., ALN1) may be applied to the substrate. The alignment layer ALN1 aligns liquid crystal molecules of the liquid crystal layer LC in a particular direction.

The component materials constituting the alignment layer ALN1 are not limited to a particular one. For example, the component materials may include a material that provides anisotropy to the alignment layer ALN1 by the light reaction generated when light is applied to the material. For example, the alignment layer ALN1 includes polymer having a photosensitive group, and may have directional properties according to a direction in which light is applied to the photosensitive group. The polymer may include polyamic acid, partially imidized polyamic acid, polyimide, or the like.

According to an embodiment of the present inventive concept, the photosensitive group may be a functional group that causes photo-decomposition. According to an embodiment of the present inventive concept, the alignment layer ALN1 may include cyclobutane-based dianhydride, polyamic acid formed of derivatives thereof and diamine, polyimide, or the like. The polyamic acid and the polyimide are cross-linked by a cross-linking agent. The cyclobutane-based dianhydride may be cyclobutane tetracarboxylic acid dianhydride, and the diamine may be aromatic diamine.

The alignment layer ALN1 may include anti-oxidants and derivatives of the anti-oxidants. The anti-oxidants may be hindered amine-based anti-oxidants.

The anti-oxidants prevent oxidation of a liquid crystal compound (e.g., an alkenyl liquid crystal compound, an alkoxy liquid crystal compound, or the like) which may be produced during the fabrication process or thereafter. The anti-oxidants prevent oxidation of a liquid crystal having a functional group with high reactivity. In addition, the anti-oxidants prevent remaining unreacted materials of the alignment layer ALN1 from being oxidized. The derivatives of the anti-oxidants may be understood to mean intermediates or resultants generated when the anti-oxidants prevent the oxidation of the liquid crystal compound or the oxidation of the component materials of the alignment layer ALN1.

The second substrate SUB2 is provided to face the first substrate SUB1. The second substrate SUB2 may include a second base substrate BS2, a color filter CF, a black matrix BM, and a second alignment layer ALN2.

The color filter CF may be provided in the display area, and may display red R, green G, and blue B color image. However, the color filter CF of the present inventive concept is not limited thereto, and may display various colors, such as white, yellow, cyan, magenta, or the like.

The black matrix BM is formed in an area of the display area DA between the color filters CF. In addition, the black matrix blocks light which transmits the liquid crystal layer LC between the pixels adjacent to each other. In addition, at least a portion of the black matrix BM is formed to overlap the non-display area NDA. Accordingly, the black matrix BM may overlap the first dummy pixels and the second dummy pixels in a plan view.

According to an embodiment of the present inventive concept, the color filter CF is provided in the second substrate SUB2, but the present inventive concept is not limited thereto. In an embodiment of the present inventive concept, the color filter CF may be provided in the first substrate SUB1.

The second alignment layer ALN2 may be provided on (or below) the color filter CF and the black matrix BM The second alignment layer ALN2 includes substantially the same material as the alignment layer ALN1, and thus description thereof will be omitted.

The liquid crystal layer LC includes liquid crystal molecules having negative anisotropy of dielectric constant, and displays images by changing transmittance of light according to an electric field formed between the pixel electrode PE and the common electrode CE. The liquid crystal layer LC may be a composition in which liquid crystal compound, non-polar liquid crystal compound, neutral liquid crystal compound, or the like are mixed. For example, the liquid crystal layer LC may be a composition including terphenyl-based liquid crystal compound, cyclohexyl-based liquid crystal compound, or the like. The liquid crystal compound may include an alkyl group, an alkenyl group, an alkoxy group, or the like, as a substituent. However, the present inventive concept is not limited thereto, and the anisotropy of dielectric constant of the liquid crystal composition or a type of the liquid crystal composition may vary according to an embodiment of the present inventive concept. For example, the liquid crystal layer LC may include liquid crystal compositions having a positive anisotropy of dielectric constant.

According to an embodiment of the present inventive concept, the pixel PX is driven by the transistor TR. For example, when the transistor TR1 is turned on in response to a gate signal which is provided through the i-th gate line GLi, a data voltage which is provided through the j-th data line DLj is applied to the pixel electrode PE through the turned-on transistor TR. Accordingly, an electric field is generated between the pixel electrode PE to which the data voltage is applied and the common electrode CE to which a common voltage is applied. The liquid crystal molecules of the liquid crystal layer LC are driven in accordance with the generated electric field generated between the pixel electrode PE and the common electrode CE, and thus, may control an amount of light transmitting through the liquid crystal molecules. Thus, an image is displayed in accordance with the amount of light which transmits through the liquid crystal layer LC. In an embodiment of the present inventive concept, the common electrode CE may be formed by a single plate shape, the pixel electrode PE may include one or more branches, and the display device may be driven in a plane-to-line switching (PLS) mode. However, a shape and a driving mode of the pixel electrode PE or the common electrode CE are not limited thereto. For example, the common electrode CE may include a plurality of branches. In this case, the branches of the pixel electrode PE may alternately be arranged with the branches of the common mode CE on a plane, and may operate in an in-plane switching (IPS) mode. For example, the branches of the pixel electrode PE may alternately be arranged with the branches of the common mode CE in a direction.

In addition, the display device may have a structure for a driving mode different from the PLS mode and IPS mode. For example, the display device may be driven in a twisted nematic (TN) mode, a vertical alignment (VA) mode, or the like. In this case, the common electrode CE may be provided in the second substrate SUB2 other than the first substrate SUB, for example, the common electrode CE may be provided on the color filter CF and black matrix BM, and a slit or a protrusion may be formed in the common electrode CE.

Figure 4A:
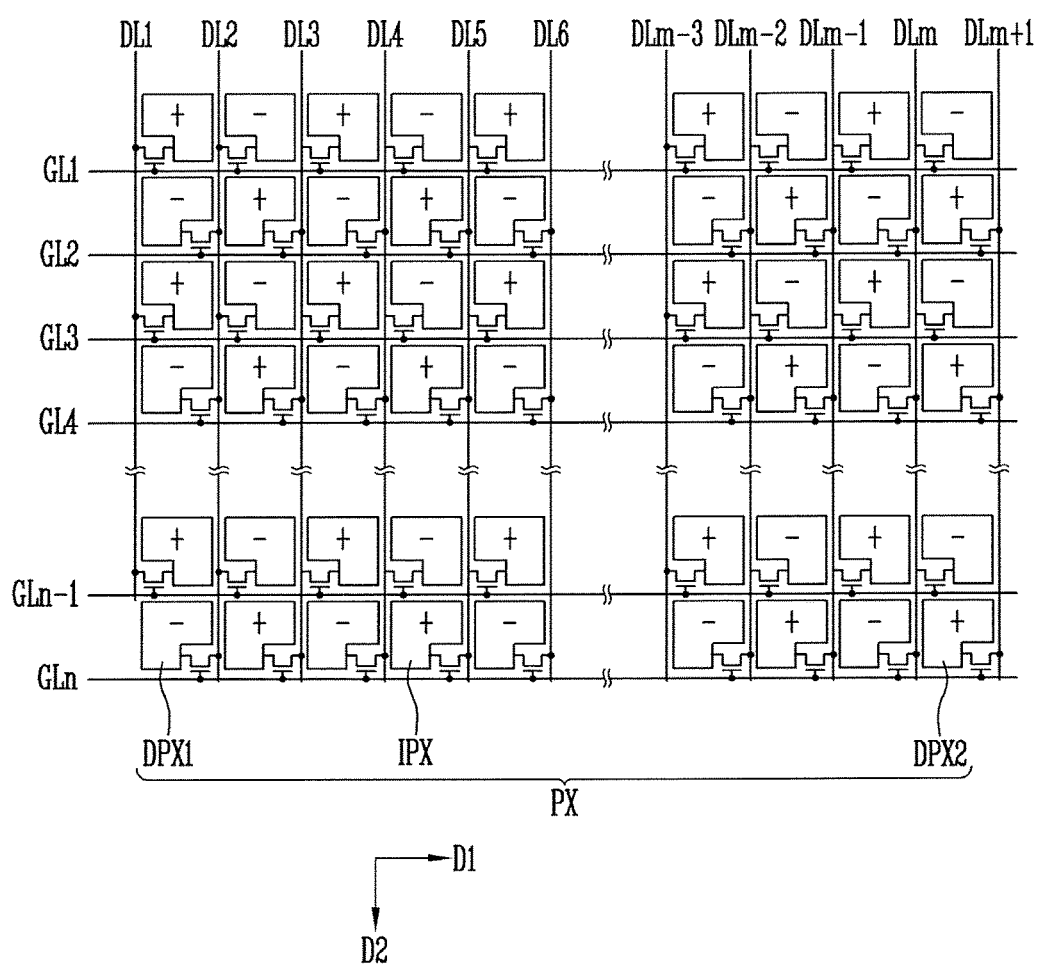
FIG. 4A is a plan view illustrating an inversion method in an odd-numbered frame of a display panel according to an embodiment of the present inventive concept.
Figure 4B:
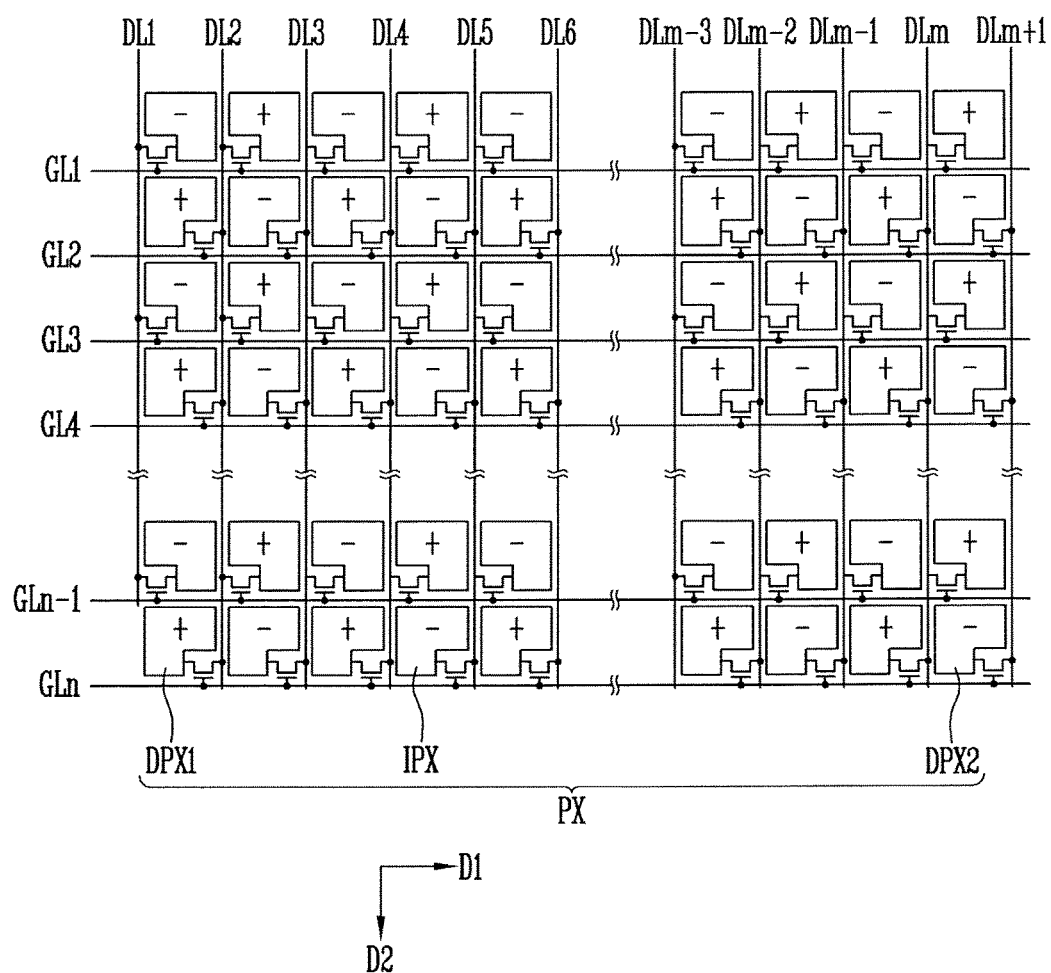
FIG. 4B is a plan view illustrating an inversion method in an even-numbered frame of a display panel according to an embodiment of the present inventive concept.

FIG. 4A is a plan view illustrating an inversion method in an odd frame of a display panel according to an embodiment of the present inventive concept. FIG. 4B is a plan view illustrating an inversion method in an even-numbered frame of a display panel according to an embodiment of the present inventive concept. In an embodiment of the present inventive concept, a display device according to an embodiment of the inventive concept displays an image by a unit of frame. FIG. 4A illustrates the display panel operating in odd-numbered frames, and FIG. 4B illustrates the display panel operating in even-numbered frames.

The display device according to an embodiment of the present inventive concept is driven according to a column-inversion scheme. As illustrated in FIG. 4A, in the odd-numbered frames, a data voltage with a first polarity is applied to the odd-numbered data lines (e.g., DL1, DL3, DL5, or the like) and a data voltage with a second polarity opposite to the first polarity is applied to the even-numbered data lines (e.g., DL2, DL4, DL6, or the like). As illustrated in FIG. 4B, in the even-numbered frames, a data voltage with the second polarity is applied to the odd-numbered data lines (e.g., DL1, DL3, DL5, or the like), and a data voltage with the first polarity is applied to the even-numbered data lines (e.g., DL2, DL4, DL6, or the like).

In FIGS. 4A and 4B, the first polarity may be a positive polarity, the second polarity may be a negative polarity, or vice versa. An exemplary embodiment of the present inventive concept in which the first polarity is the positive polarity with respect to the common voltage and the second polarity is the negative polarity with respect to the common voltage will be described with reference with FIGS. 4A and 4B.

Referring back to FIG. 4A, in the odd-numbered frames, a data voltage of the positive polarity and a data voltage of the negative polarity are applied alternately to the first data line DL1 through the (m+1)-th data line DLm+1. In this case, the pixels in each odd-numbered row are sequentially coupled to the first data line DL1 through the m-th data line DLm, and thus, the data voltage of the positive polarity and the data voltage of the negative polarity are alternately applied to the pixels in each odd-numbered row. The pixels in each even-numbered row are sequentially coupled to the second data line DL2 through the (m+1)-th data line DLm+1, and thus, the data voltage of the positive polarity and the data voltage of the negative polarity are alternately applied to the pixels in each even-numbered row.

Referring back to FIG. 4B, in the even-numbered frames, a data voltage of the negative polarity and a data voltage of the positive polarity are applied alternately to the first data line DL1 through the (m+1)-th data line DLm+1. In this case, the pixels in each odd-numbered row are sequentially coupled to the first data line DL1 through m-th data line DLm, and thus, the data voltage of the negative polarity and the data voltage of the positive polarity are alternately applied to the pixels in each odd-numbered row. The pixels in each even-numbered row are sequentially coupled to the second data line DL2 to the (m+1)-th data line DLm+1, and thus, the data voltage of the positive polarity and the data voltage of the negative polarity are alternately applied to the pixels in each even-numbered row.

Accordingly, the pixels of the display device are driven according to the same manner as a dot-inversion driving scheme. For example, during a first frame, a polarity of a first pixel (e.g., a reference pixel) is opposite to polarities of pixels surrounding the first pixel, and during a second frame subsequent to the first frame, respective polarities of the first pixel and the pixels surrounding the first pixel are inverted from the polarities during the first frame. Thus, the polarity of the first pixel is opposite to the polarities of the pixels surrounding the first pixel.

In a display device according to an embodiment of the present inventive concept, respective polarities of the pixel voltages (e.g., data voltages) which are supplied to the data lines from a data drive unit are inverted in the row and column directions, which may be understood as the dot-inversion scheme. Thus, flickers, which may occur between pixels adjacent to each other in a row or column direction, may be cancelled from each other.

In a display device according to an embodiment of the present inventive concept, denaturalization in color of a pixel in an edge portion of the display area may be prevented from occurring. This will be described more in detail as follows.

Figure 5A:
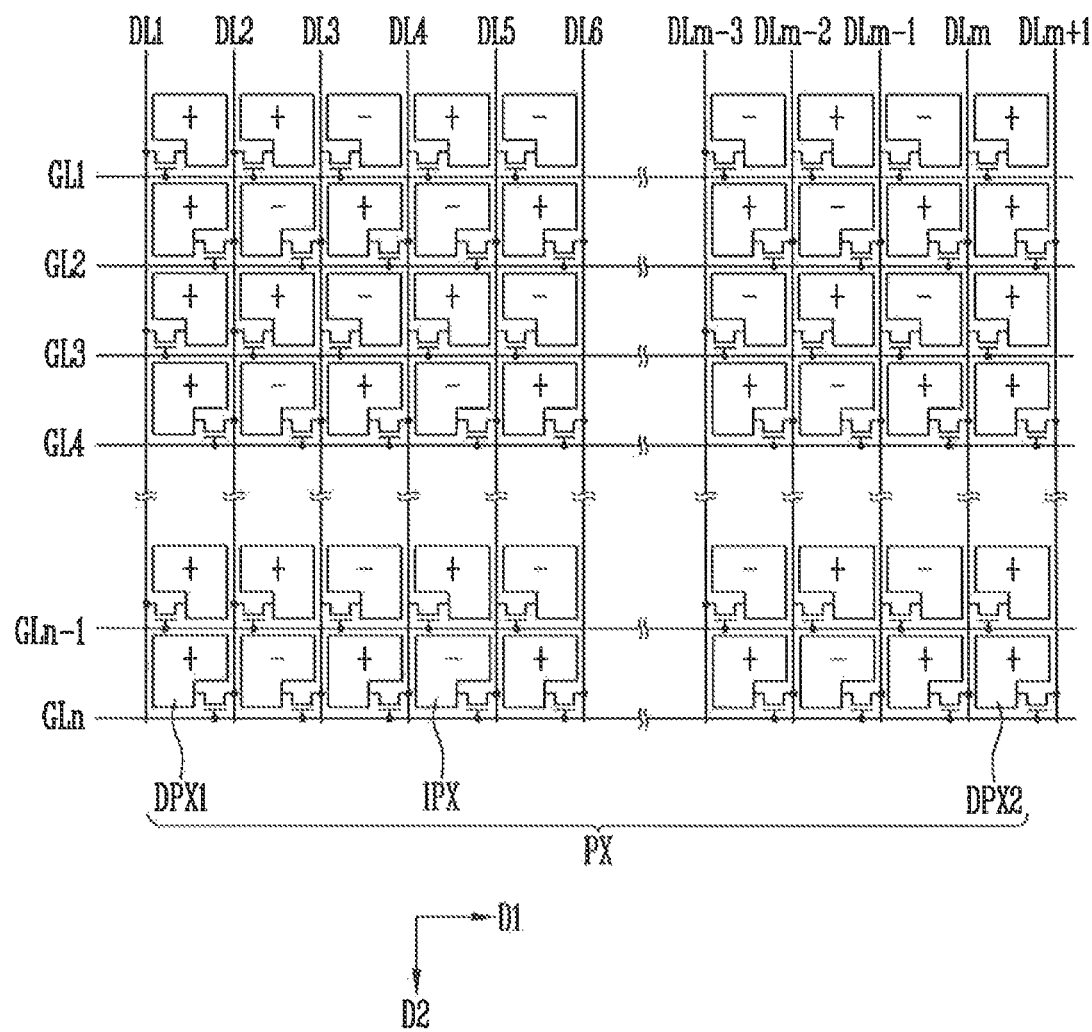
FIG. 5A is a plan view illustrating an inversion method in an odd-numbered frame of a display panel according to a comparative example.
Figure 5B:
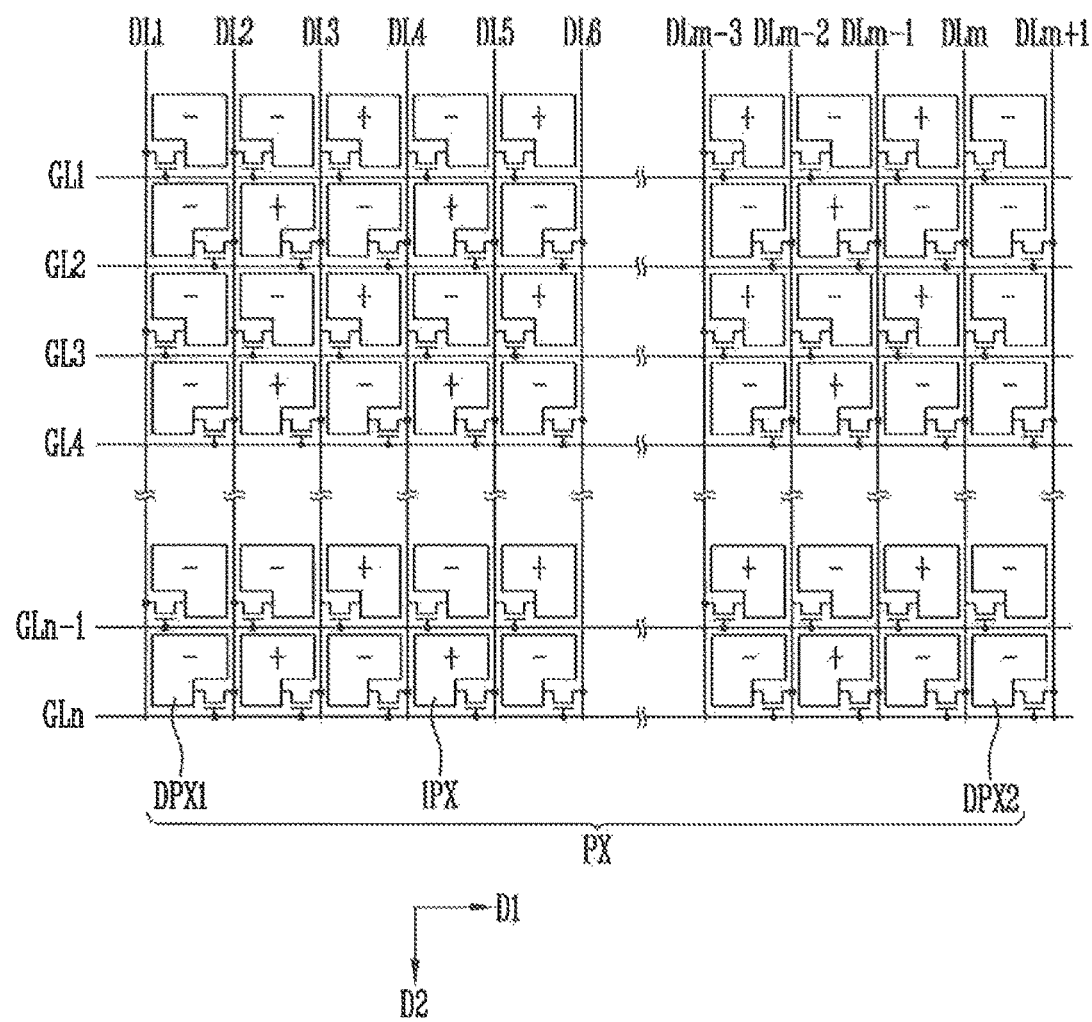
FIG. 5B is a plan view illustrating an inversion method in an even-numbered frame of a display panel according to a comparative example.

FIG. 5A is a plan view illustrating an inversion method in an odd-numbered frame of a display panel according to a comparative example. FIG. 5B is a plan view illustrating an inversion method in an even-numbered frame of a display panel according to a comparative example. The display panel described with reference to FIGS. 5A and 5B displays an image by a unit of frame.

Referring to FIG. 5A, the first data line DL1 and the second data line DL2 may be coupled to each other, and thus, the same data voltage may be applied to the first data line DL1 and the second data line DL2. Thus, in the odd-numbered frames, a data voltage applied to a pixel (e.g., a display pixel IPX) in an odd-numbered row (e.g., a first row) and the second column is the same as a data voltage applied to a pixel (e.g., a dummy pixel DPX1) in the odd-numbered row and the first column provided in a non-display area. Accordingly, when a data voltage with the positive polarity is supplied from the first data line DL1 and the second data line DL2, the same data voltage with the positive polarity may be applied to the dummy pixel DPX1 in the odd-numbered row and the first column and the display pixel IPX in the odd-numbered row and the second column.

Referring to FIG. 5B, the first data line DL1 and the second data line DL2 may be coupled to each other, and thus, the same data voltage may be applied to the first data line DL1 and the second data line DL2. Thus, in the even-numbered frames, a data voltage applied to a pixel (e.g., a display pixel IPX) in an odd-numbered row (e.g., a first row) and the second column is the same as a data voltage applied to a pixel (e.g., a dummy pixel DPX1) in the odd-numbered row and the first column provided in the non-display area. Accordingly, when a data voltage with the negative polarity is supplied from the first data line DL1 and the second data line DL2, the same data voltage with the negative polarity may be applied to the dummy pixel DPX1 in the odd-numbered row and the first column and the display pixel IPX in the odd-numbered row and the second column.

Thus, a data voltage applied to a pixel (e.g., a dummy pixel DPX1) in the first column of each odd-numbered row may be the same (e.g., in polarity) as a data voltage applied to a pixel (e.g., a display pixel IPX) in the second column of each odd-numbered row, regardless of whether the polarities of pixels are inverted in row and column directions.

Referring back to FIG. 5A, the m-th data line DLm and the (m+1)-th data line DLm+1 may be coupled to each other, and thus, the same data voltage may be applied to the m-th data line DLm and the (m+1)-th data line DLm+1. Thus, in the odd-numbered frames, a data voltage applied to a pixel (e.g., a display pixel IPX) in an even-numbered row (e.g., a second row) and the (m−1)-th column of the display area is the same as a data voltage applied to a pixel (e.g., a dummy pixel DPX2) in the even-numbered row and the m-th column provided in a non-display area. Thus, when a data voltage with the positive polarity is supplied from the m-th data line DLm and the (m+1)-th data line DLm+1, the same data voltage with positive polarity may be applied to the dummy pixel DPX2 in the even-numbered row and the m-th column and the display pixel IPX in the even-numbered row and the (m−1)-th column.

Referring back to FIG. 5B, the m-th data line DLm and the (m+1)-th data line DLm+1 may be coupled to each other, and thus, the same data voltage may be applied to the m-th data line DLm and the (m+1)-th data line DLm+1. Thus, in the even-numbered frames, a data voltage applied to a pixel (e.g., a display pixel IPX) in an even-numbered row (e.g., a second row) and the (m−1)-th column is the same as a data voltage applied to a pixel (e.g., a dummy pixel DPX2) in the even-numbered row and the m-th column provided in the non-display area. Thus, when a data voltage with the negative polarity is supplied from the m-th data line DLm and the (m+1)-th data line DLm+1, the same data voltage with the negative polarity may be applied to the dummy pixel DPX2 in the even-numbered row and the m-th column and the display pixel IPX in the even-numbered row and the (m−1)-th column.

Accordingly, a data voltage applied to a pixel (e.g., a dummy pixel DPX2) in the m-th column of each even-numbered row may be the same (e.g., in polarity) as a data voltage applied to a pixel (e.g., a display pixel IPX) in the (m−1)-th column of each even-numbered row, regardless of whether the polarities of pixels are inverted in row and column directions.

As described above, when the display pixel IPX (e.g., pixel in the second column) in an edge portion of the display area and the dummy pixel (e.g., pixels DPX1 in the first column) of the non-display area are driven to have the same polarity from each other for a long time, although the display pixel IPX and the dummy pixel (e.g., DPX1) are inversely driven, ionic impurities may be accumulated in the edge portion of the display area.

In a case in which the display device is driven, the ionic impurities may be produced when energy such as heat or ultraviolet light is applied to a liquid crystal of the display device and liquid crystal compounds are decomposed or react in liquid crystal compositions, or other material other than the liquid crystal in the liquid crystal compositions are decomposed. The ionic impurities may be produced by a reactor (e.g., liquid crystal compounds having alkenyl group and/or alkoxy group) with strong reactivity, or may be produced by residues of an alignment layer of a photolysis type. In addition, the ionic impurities may be produced by anti-oxidants preventing oxidation of liquid crystal compounds or residues of the alignment layer of a photolysis type when the alignment layer is formed.

The ionic impurities may cause accumulation of DC current therein, and thus liquid crystal molecules may abnormally be driven. If the liquid crystal molecules are abnormally driven, an edge portion of the display area may become blue, red, or the like.

According to an embodiment of the present inventive concept, different data voltages in, e.g., polarity, are applied to each of the display pixels and each of the dummy pixels which are adjacent to each other in the edge of the display area, as illustrated in FIGS. 4A and 4B, and thus ionic impurities or DC current therein may be prevented from being accumulated. Accordingly, defects in the edge of the display area may be prevented from being produced, and thus, pixels adjacent to the edge of the display area may be prevented from becoming blue, red, or the like.

Although the present inventive concept has been shown and described with reference to exemplary embodiments thereof, it will be understood by those skilled in the art that various changes in forms and details may be made therein without departing from the spirit and scope of the present inventive concept as defined in the appended claims.

What is claimed is:

1. A display device including a display area in which an image is displayed and a non-display area provided on at least one side of the display area, comprising:
    a first base substrate;
    first through n-th gate lines provided on the first base substrate, each of the first through n-th gate lines extending in a row direction, wherein n is a natural number greater than 1;
    first through (m+1)-th data lines provided on the first base substrate, each of the first through (m+1)-th data lines extending in a column direction, wherein m is a natural number greater than 1; and
    a plurality of pixels arranged in a matrix form, each of which is coupled to a corresponding gate line of the gate lines and a corresponding data line of the data lines,
    wherein the plurality of pixels include first dummy pixels arranged in a first column and second dummy pixels arranged in an m-th column,
    wherein the first dummy pixels in the first column are independently driven from each pixel in a second column adjacent to the first column, with some of the first dummy pixels being connected to the first data line, and remaining ones of the first dummy pixels being connected to a second data line adjacent to the first data line,
    wherein some of the second dummy pixels are connected to an m-th data line of the data lines, and remaining ones of the second dummy pixels are connected to the (m+1)-th data line adjacent to the m-th data line,
    wherein the first dummy pixels and the second dummy pixels are provided in the non-display area,
    wherein in a given frame, the first dummy pixels connected to the first data line and the second dummy pixels connected to the (m+1)-th data line display a black image by being driven with a voltage having a same polarity, and the first dummy pixels connected to the second data line and the second dummy pixels connected to the m-th data line display a black image by being driven with a voltage having a same polarity,
    wherein the first dummy pixels connected to the first data line are independently driven from the second dummy pixels connected to the (m+1)-th data line, and
    wherein a polarity of the voltage applied to the first dummy pixels is different from a polarity of an adjacent pixel in a same row as the first dummy pixels.

2. The display device according to claim 1, wherein a first pixel coupled to an odd-numbered gate line among the plurality of pixels is coupled to a data line disposed on one side of the first pixel in the column direction, and a second pixel coupled to an even-numbered gate line among the plurality of pixels is coupled to a data line disposed on another side of the first pixel in the column direction.

3. The display device according to claim 2, wherein each of the plurality of pixels includes:

a thin film transistor coupled to the corresponding gate line and the corresponding data line;

a pixel electrode coupled to the thin film transistor;

a common electrode electrically separated from the pixel electrode, a common voltage being applied to the common electrode; and a liquid crystal layer provided on the first base substrate.

4. The display device according to claim 3, further comprising:

a gate driver configured to output a gate signal to the gate lines; and a data driver configured to output a data voltage to the data lines in response to the gate signal.

5. The display device according to claim 4, wherein, in an odd-numbered frame, a data voltage with a first polarity is applied to an odd-numbered data line, and a data voltage with a second polarity opposite to the first polarity is applied to an even-numbered data line.

6. The display device according to claim 5, wherein, in an even-numbered frame, the data voltage with the second polarity is applied to the odd-numbered data line, and the data voltage with the first polarity is applied to the even-numbered data line.

7. The display device according to claim 6, wherein the first polarity is a positive polarity with respect to the common voltage, and the second polarity is a negative polarity with respect to the common voltage.

8. The display device according to claim 6, wherein the first polarity is a negative polarity with respect to the common voltage, and the second polarity is a positive polarity with respect to the common voltage.

9. The display device according to claim 1, further comprising:

a second base substrate facing the first base substrate, wherein a liquid crystal layer is interposed between the second base substrate and the first base substrate.

10. The display device according to claim 9, wherein each of a pixel electrode and a common electrode is provided between the first base substrate and the liquid crystal layer.

11. The display device according to claim 9, wherein a pixel electrode is disposed between the first base substrate and the liquid crystal layer, and a common electrode is provided between the second base substrate and the liquid crystal layer.

12. The display device according to claim 9, further comprising:

a first alignment layer provided between the first base substrate and the liquid crystal layer; and a second alignment layer provided between the second base substrate and the liquid crystal layer.

13. The display device according to claim 9, further comprising:

a black matrix provided on at least one of the first base substrate and the second base substrate, wherein at least a portion of the black matrix overlaps a pixel in the first column or the m-th column.

14. The display device according to claim 1, wherein:

in the given frame, for each second dummy pixel of the second dummy pixels, the second dummy pixel displays a black image by being driven with a voltage having a polarity, with respect to the common voltage, that is different from a polarity of an adjacent pixel in a same row as the second dummy pixel.

15. The display device according to claim 14, wherein in the given frame, the polarity of a voltage used to drive the first dummy pixel in a first row, driven from the first data line, is opposite from the polarity of a voltage used to drive the second dummy pixel in a second row, driven from the (m+1)-th data line.

16. A display panel, comprising:

first through n-th gate lines each of which extends in a row direction, wherein n is a natural number greater than 1;

first through (m+1)-th data lines each of which extends in a column direction, wherein m is a natural number greater than 1; and a plurality of pixels arranged in a matrix form, each of which is connected to a corresponding gate line of the gate lines and a corresponding data line of the data lines, wherein pixels in a first row are respectively connected to the first through m-th data lines, and pixels in a second row adjacent to the first row are respectively connected to the second through (m+1)-th data lines, and wherein pixels in a first column include a plurality of first dummy pixels driven to display a black image, with some of the first dummy pixels being driven from the first data line and remaining ones of the first dummy pixels being driven from a second one of the data lines, wherein pixels in an m-th column include a plurality of second dummy pixels driven to display the black image, with some of the second dummy pixels being driven from an m-th data line of the data lines and remaining ones of the second dummy pixels being driven from the (m+1)-th data line adjacent to the m-th data line, wherein the first dummy pixels being driven from the first data line are independently driven from the second dummy pixels being driven from the (m+1)-th data line, wherein in a given frame, each first dummy pixel of the first dummy pixels displays a black image by being driven with a voltage having a polarity, with respect to a common voltage, that is different from a polarity of an adjacent pixel in a same row as each first dummy pixel, and wherein in the given frame the first dummy pixels connected to the first data line and the second dummy pixels connected to the (m+1)-th data line display a black image by being driven with a voltage having a same polarity, and the first dummy pixels connected to the second data line and the second dummy pixels connected to the m-th data line display a black image by being driven with a voltage having a same polarity.

17. The display panel according to claim 16, wherein, in a first frame, a data voltage applied to the first data line has a first polarity, and a data voltage applied to the second data line has a second polarity opposite the first polarity, wherein, in a second frame subsequent to the first frame, the data voltage applied to the first data line has the second polarity, and the data voltage applied to the second data line has the first polarity, and wherein the first and second data lines are adjacent to each other.

18. The display panel of claim 16, wherein in the given frame, a data voltage of a first polarity and a data voltage of an opposite polarity are applied alternately to the first data line through the (m+1)-th data line.

19. The display panel according to claim 16, wherein pixels in a second column among the plurality of pixels are disposed in a display area of the display panel, and wherein the first column is adjacent to the second column, and the plurality of first dummy pixels are disposed in a non-display area, the non-display area being disposed on one side of the display area in the row direction.

20. The display panel according to claim 19, wherein pixels in an m-th column among the plurality of pixels are disposed in the non-display area disposed on another one side of the display area in the row direction,
   wherein pixels in an (m−1)-th column adjacent to the m-th column among the plurality of pixels are disposed in the display area.

* * * * *